United States Patent
Bosma et al.

(10) Patent No.: US 7,198,003 B2
(45) Date of Patent: *Apr. 3, 2007

(54) MILKING ARRANGEMENT

(75) Inventors: Epke Bosma, Tumba (SE); Björn Johansson, Södertälje (SE)

(73) Assignee: DeLaval Holding AB, Tumba (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/490,151

(22) PCT Filed: Sep. 18, 2002

(86) PCT No.: PCT/SE02/01690

§ 371 (c)(1),
(2), (4) Date: Mar. 18, 2004

(87) PCT Pub. No.: WO03/024201

PCT Pub. Date: Mar. 27, 2003

(65) Prior Publication Data

US 2004/0244698 A1  Dec. 9, 2004

(30) Foreign Application Priority Data

Sep. 20, 2001  (SE)  .................................... 0103137

(51) Int. Cl.
*A01J 5/00* (2006.01)
(52) U.S. Cl. .................................................. 119/14.18
(58) Field of Classification Search ............. 119/14.02, 119/14.08, 14.18, 14.25
See application file for complete search history.

(56) References Cited

U.S. PATENT DOCUMENTS

| | | | | | |
|---|---|---|---|---|---|
| 2,616,809 | A | * | 11/1952 | Graves | ........................ 426/392 |
| 2,730,992 | A | * | 1/1956 | Kessler | ..................... 119/14.03 |
| 2,794,420 | A | * | 6/1957 | Recchia | ..................... 119/14.18 |
| 2,997,049 | A | * | 8/1961 | Thomas | ................... 134/169 C |
| 3,111,112 | A | * | 11/1963 | Fjermestad | .............. 119/14.07 |
| 3,116,743 | A | * | 1/1964 | Sparr | ....................... 134/102.1 |
| 3,228,374 | A | | 1/1966 | Sampson et al. | |
| 5,275,124 | A | * | 1/1994 | van der Lely et al. | ..... 119/14.08 |
| 5,606,932 | A | * | 3/1997 | van der Lely | ........... 119/14.14 |
| 5,881,669 | A | * | 3/1999 | van den Berg et al. | ... 119/14.03 |
| 6,561,126 | B2 | * | 5/2003 | Forsen et al. | ............ 119/14.02 |

(Continued)

FOREIGN PATENT DOCUMENTS

DE  3244969 A1  6/1984

(Continued)

*Primary Examiner*—T. Nguyen
(74) *Attorney, Agent, or Firm*—Hovey Williams LLP

(57) ABSTRACT

The present invention refers to an arrangement and a method for milking of animals. The arrangement includes a number of milking stations (1), a central milk-receiving unit (30–32), and a transport conduit (15). Each milking station (1) includes a set of teatcups to be attached to the animal to be milked, a local milk-collecting unit, a milk discharge conduit (12) and a feeding member. The transport conduit (15) connects each milk discharge conduit to the central milk-receiving unit for the transport of milk from each milking station to the central receiving unit. The feeding member of each milking station is arranged to feed the milk from the milk-collecting unit to the transport conduit (15) via the milk discharge conduit (12). The transport conduit (15) is arranged to permit said transport of milk by means of the gravity force.

18 Claims, 2 Drawing Sheets

U.S. PATENT DOCUMENTS

| | | | |
|---|---|---|---|
| 6,584,930 B2 * | 7/2003 | Buecker | 119/14.02 |
| 2004/0244697 A1 * | 12/2004 | Bosma et al. | 119/14.03 |

FOREIGN PATENT DOCUMENTS

| EP | 0 399 604 A1 | 5/1990 |
|---|---|---|
| EP | 0 626 129 A1 | 5/1994 |
| EP | 0 797 915 A2 | 3/1997 |
| WO | WO 96/11567 | 4/1996 |
| WO | WO 01/19173 A1 | 3/2001 |
| WO | WO 01/19175 A1 | 3/2001 |

* cited by examiner

MILKING ARRANGEMENT

THE BACKGROUND OF THE INVENTION AND PRIOR ART

The present invention refers to an arrangement for milking of animals, including a number of milking stations, each milking station including a set of teatcups to be attached to the animal to be milked, a local milk-collecting unit, a milk discharge conduit and a feeding member; a central milk-receiving unit; and a transport conduit connecting each milk discharge conduit to the central milk-receiving unit for the transport of milk from each milking station to the central milk-receiving unit, said feeding member of each milking station being arranged to feed the milk from the local milk-collecting unit to the transport conduit via the milk discharge conduit. Furthermore, the invention refers to a method for milking of animals in a milking arrangement including a number of milking stations.

In big milking installations including a large number of milking stations, it is a difficult task to provide a proper transport of the milk to a common milk storage and cooling tank. The milk delivery conduits will be long and a complex equipment is needed at the common milk storage and cooling tank in order to obtain a proper cleaning of the milking arrangement.

It is known to use the vacuum of a milking plant for transporting the milk to a milk-receiving unit. However, transporting milk by vacuum makes it necessary to provide a transport conduit that is filled by milk or any other liquid, such as washing liquid. The vacuum transport will not function when the conduit is not full across its diameter. It is also known to draw the milk by vacuum from a number of milking stations to a common milk line. The milk line is sloping to permit further transport of the milk to a releaser jar by means of gravity.

EP-A-797 915 discloses a milking arrangement with a milk-collecting container and at least one intermediate milk container. The milk reaches the intermediate milk container by means of vacuum from the vacuum source of the arrangement. The milk is transported from the intermediate container to the milk-collecting container by means of a pressurised gas, but the document also points to the possibility of performing this transport by means of gravity. However, EP-A-797 915 does not appear to be directed to solve the problems of connecting a large number of independent milking stations to a common milk-collecting container.

SUMMARY OF THE INVENTION

The object of the present invention is to provide a simple and reliable transport of the milk from a number of milking stations to a common milk-receiving unit.

This object is obtained by the arrangement initially defined, which is characterised in that the transport conduit is arranged to permit said transport of milk by means of the gravity force.

By such an arrangement, the milk produced in each milking station can be transported at any point of time, independent of all the other milking stations to the milk-receiving unit. Consequently, when the local milk-collecting unit is filled, the milk therein can immediately be fed via the discharge conduit to the transport conduit, and flow by gravity within the transport conduit to the common milk-receiving unit.

According to an embodiment of the invention, each milking station is arranged to operate substantially completely independently of each of the other milking stations. This is advantageous in modern milking installations where the milking stations are visited by the animals on a voluntary basis. Thereby, each milking station may include a vacuum source arranged to provide a low pressure for extracting milk from the teats of an animal to be milked and for conveying the milk extracted to the local milk-collecting unit via said teatcups. Such a vacuum source may for instance be obtained by a local vacuum pump. However, the independence of the milking stations can also be maintained by a vacuum source in the form of a vacuum pump providing a low pressure for a number of milking stations.

According to a further embodiment of the invention, each milking station is arranged to permit automatic attachment of the teatcups to the teats of the animal to be milked. In such a way the milking arrangement may be substantially fully automatic with regard to the handling of the equipment of the milking station during the milking procedure as well as the handling of the milk produced during the milking procedure.

According to a further embodiment of the invention, said feeding member includes a pump arranged to pump the milk by pressure to the transport conduit. By such a pump, the milk may in a convenient manner be lifted to the level of the transport conduit.

According to a further embodiment of the invention, each milking station includes a first valve device permitting closing off of the milk discharge conduit. Advantageously, such a valve device is normally closed, and only open when milk is fed to the transport conduit.

According to a further embodiment of the invention, each milking station includes a local washing plant for washing of the teatcups and the local milk-collecting unit, wherein the first valve device is arranged to be closed during said washing.

According to a further embodiment of the invention, the local washing plant includes a washing conduit for forming a re-circulation circuit including the teatcups, the local milk-collecting unit and at least a part of the milk discharge conduit, wherein the washing conduit is connected to the milk discharge conduit and includes a second valve device arranged to be opened during washing and closed during milking.

According to a further embodiment of the invention, the transport conduit forms a substantially closed re-circulation conduit. Especially, the transport conduit may have an approximate U-shape, wherein the bottom of the U is at the highest level and the two legs of the U at their opposite ends are connected to the milk-receiving unit at the lowest level of the transport conduit. In such a design, a milking station can be connected to the transport conduit at a substantially arbitrary position along its U-shaped extension.

According to a further embodiment of the invention, the arrangement includes a central washing plant for washing of the transport conduit. Such a central washing plant may, preferably, include central means arranged to circulate washing liquid through the transport conduit during said washing, wherein each first valve device is arranged to be closed during said washing of the transport conduit.

According to a further embodiment of the invention, the central milk-receiving unit includes a central milk-collecting container forming a part of the transport conduit and arranged to collect the milk transported by gravity through the transport conduit. Advantageously, said central means includes a vacuum source connectable to the central milk-collecting container for providing said circulation of washing liquid through the transport conduit and the central milk-collecting container during said washing.

According to a further embodiment of the invention, the central milk-receiving unit includes a central milk storage tank, which is connectable to the central milk-collecting container and arranged to receive the milk from the milk-collecting container. The central milk storage tank may have means for cooling the milk stored therein. The central milk-receiving unit may include a central pump device arranged to pump the milk from the milk-collecting container to the milk storage tank.

The object is also obtained by the method initially defiend, which includes the steps of:

attaching teatcups to the teats of animals to be milked in said milking stations, milking said animals, collecting the milk in a local milk-collecting unit in each milking stations during milking of said animals, feeding the milk from the local milk-collecting unit via a local milk discharge conduit to a common transport conduit;

transporting the milk in the common transport conduit by means of gravity to a common central milk-receiving unit.

BRIEF DESCRIPTION OF THE DRAWINGS

The present invention will now be described more closely by means of the description of examples of various embodiments and with reference to the drawings attached.

DETAILED DESCRIPTION OF VARIOUS EMBODIMENTS OF THE INVENTION

Figure 1:
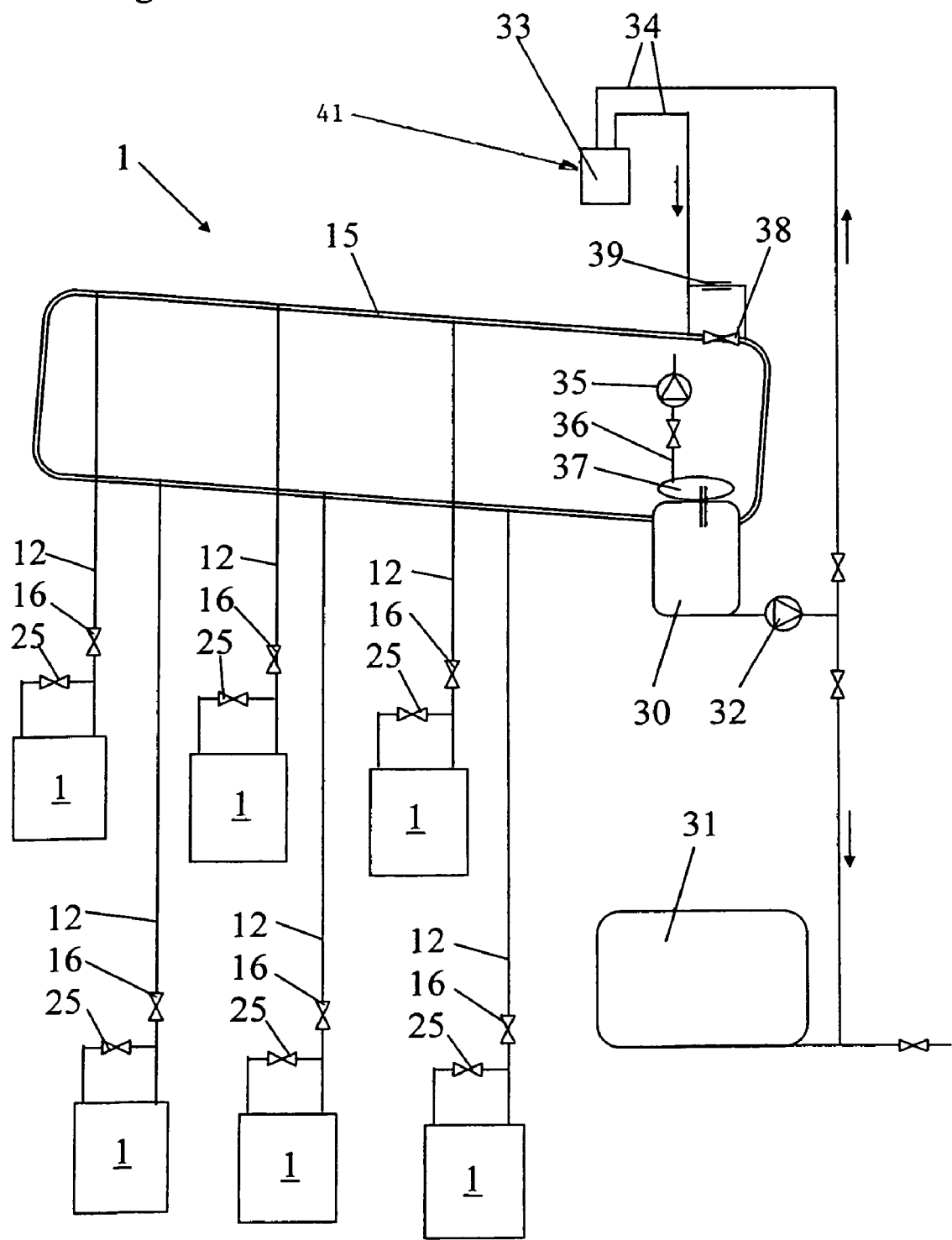
FIG. 1 discloses a schematic illustration of a milking arrangement according to an embodiment of the invention.
Figure 2:
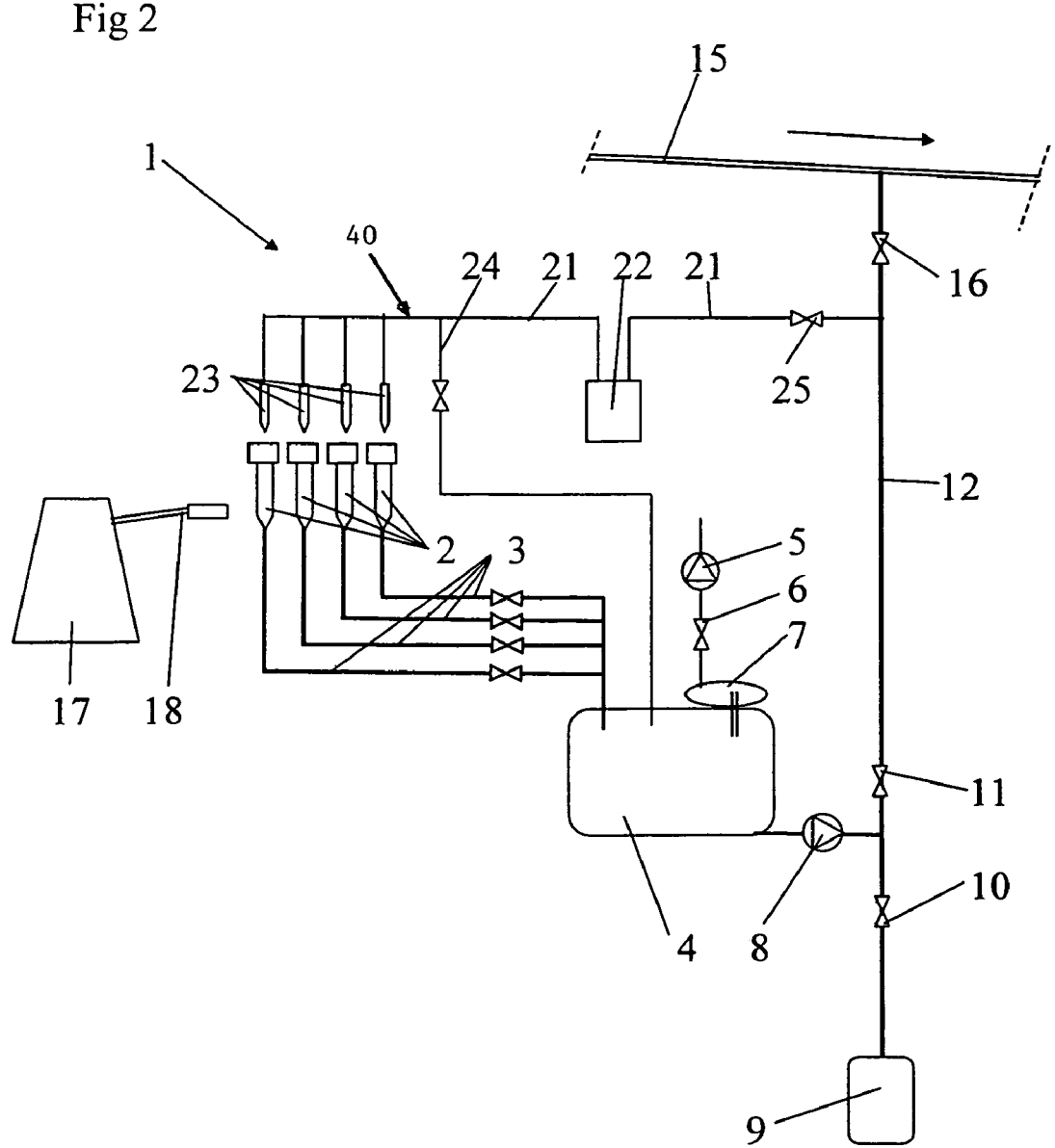
FIG. 2 discloses a schematic illustration of a milking station of the milking arrangement in FIG. 1.

FIG. 1 discloses a milking arrangement for milking of animals. The milking arrangement includes a number of milking stations 1, each being arranged for milking of at least one animal at a time. One such milking station 1 is more closely disclosed in FIG. 2. The milking station 1 includes a milking machine having a set of four teatcups 2 to be attached to the animal to be milked and four milk conduits 3 for conveying the milk extracted from the animal from the teatcups 2 to a local milk collecting unit 4. A vacuum or low pressure is applied to the milk-collecting unit 4 from a vacuum source. In the embodiment disclosed in FIG. 2 the vacuum source is a local vacuum pump 5, which is connected to the milk-collecting unit 4 via a vacuum conduit 6 and a trap member 7 preventing milk from reaching the vacuum conduit 6. By means of the vacuum pump 5, a vacuum, or a low pressure, is thus applied to the teatcups 2 in a conventional manner. It is to be noted, that the milking machine also includes means for providing a pulsating movement to teatcup liners (not disclosed) in the teatcups 2.

The milk extracted from the teatcups 2 is thus collected in the local milk-collecting unit 4. The fore milk, i.e., the first quantity of milk obtained during a milk procedure, may be fed by a feed member, for example, pumped by means of a milk pump 8, to a divert container 9. The fore milk, or any other milk not suitable for consumption, may be led to the divert container 9 by opening of a valve 10 and closing of a valve 11. When milk suitable for consumption is contained in the milk-collecting unit 4 it may be pumped away from the milking station 1 via a milk discharge conduit 12 by means of the milk pump 8. Thereby, the milk is pumped, or lifted, to a transport conduit 15, see FIG. 1, to be described more closely below. During feeding of the milk to the transport conduit 15 the valve 11 and a first valve device 16, provided on the milk discharge conduit 12, are both open, whereas the valve 10 is closed.

Furthermore, each milking station 1 includes an automatic handling device 17 arranged to attach in an automatic manner the teatcups 2 to the teats of the animal to be milked. The automatic handling device 17, which is schematically disclosed in FIG. 2, comprises a robot arm 18 for gripping and moving the teatcups 2. The automatic handling device 17 is also arranged to put the teatcups 2 in a washing position, in which the teatcups 2 may be washed in a time period between two successive milking procedures.

Each milking station also includes a local washing plant 40 for washing of the teatcups 2, the milk conduits 3, the local milk-collecting unit 4, the milk pump 8 and at least a part of the milk discharge conduit 12. The local washing plant includes a washing conduit 21, a washing machine 22 for the addition of washing liquid and any cleaning agents, and washing nozzles 23 to be introduced into the teatcups 2 for washing thereof. The washing plant 40 also includes a washing line 24 for conveying washing liquid directly to the milk-collecting unit 4. Consequently, the washing conduit 21, the milk conduits 3, the milk-collecting unit 4, the washing line 24 and the milk discharge conduit 12 forms a substantially closed re-circulation circuit. During washing of said components of the milking station 1, the first valve device 16 and the valve 10 are closed, whereas a second valve device 25, provided on the washing conduit 21, and the valve 11 are opened.

Consequently, each milking station 1 includes all means necessary for performing milking of an animal and washing of the components included in the milking station 1. The milking stations 1 are thus provided to operate substantially completely independently of each other.

The transport conduit 15, to which each milking station is connected, extends in a substantially U-shaped path and forms a substantially closed re-circulation circuit together with a central milk-collecting container 30. The transport conduit 15 is arranged to permit transport of the milk, delivered by the different milking stations 1, to the milk-collecting container 30 by means of the gravity force. As is indicated in FIG. 1 the transport conduit 15 is inclined in such a manner that the two legs of the U-shaped path slope downwardly towards the central milk-collecting container. Consequently, the milk delivered via the milk discharge conduits 12 to the transport conduit 15 will flow downwardly to the milk-collecting container 30. Preferably, the highest level of the transport conduit 15 is located at a position most distant from the milk-collecting container 30, whereas the lowest level of the transport conduit 15 is located at the milk-collecting container 30.

The milk collected in the milk-collecting container 30 can then be pumped to a central milk storage tank 31 by means of a central pump device 32. The central milk-collecting container 30, the central milk storage tank 31 and the central pump device 32 thus form a central milk-receiving unit.

The arrangement also includes a central washing plant 41 for washing the transport conduit 15 and the central milk-collecting member 30. The central washing plant 41 includes a washing line 34 connecting the washing machine 33 to the transport conduit 15 and the central pump device 32. Consequently, a substantially closed washing circuit is formed by the washing line 34, the transport conduit 15, the central milk-collecting member 30 and the central pump device 32. During washing the first valve devices 16 of each milking station is closed 1. The central milk-collecting container 30 is connected to a vacuum source for being subjected to a vacuum or low pressure the vacuum source is obtained by a vacuum pump 35 which via a vacuum conduit 36 and a trap member 37 is connected to the central milk-collecting container 30. An efficient washing of the transport conduit is obtained by subjecting the milk-collecting container 30 to said vacuum, whereby the washing liquid will be sucked through the transport conduit 15. During washing of the transport conduit 15, a closing valve 38, provided on the transport conduit 15, is closed, wherein a small flow of the washing liquid may bypass the valve 38 via a throttling 39.

The invention is not limited to the embodiments disclosed and described herein but may be varied and modified within the scope of the following claims.

The invention claimed is:

1. An arrangement for milking of animals, comprising:
   plurality of milking stations, each milking station including a set of teatcups to be attached to the animal to be milked, a local milk-collecting unit, a milk discharge conduit and a feeding member;
   a central milk-receiving unit; and
   a transport conduit connecting each milk discharge conduit to the central milk-receiving unit for the transport of milk from each milking station to the central milk-receiving unit,
   said feeding member of each milking station being arranged to feed the milk from the local milk-collecting unit to the transport conduit via the milk discharge conduit,
   wherein the transport conduit is arranged to permit said transport of milk substantially completely by means of gravity force.

2. An arrangement according to claim 1, wherein each milking station is arranged to operate substantially completely independently of each of the other milking stations.

3. An arrangement according to claim 2, wherein each milking station includes a vacuum source arranged to provide a low pressure for extracting milk from the teats of an animal to be milked and for conveying the milk extracted to the local milk-collecting unit via said teatcups.

4. An arrangement according to claim 1, wherein each milking station is arranged to permit automatic attachment of the teatcups to the teats of the animal to be milked.

5. An arrangement according to claim 1, wherein said feeding member includes a pump arranged to pump the milk by pressure to the transport conduit.

6. An arrangement according to claim 1, wherein each milking station includes a first valve device permitting closing off of the milk discharge conduit.

7. An arrangement according to claim 1, wherein each milking station includes a local washing plant for washing of the teatcups and the local milk-collecting unit.

8. An arrangement according to claim 6, wherein each milking station includes a local washing plant for washing of the teatcups and the local milk-collecting unit, and wherein the first valve device is arranged to be closed during said washing.

9. An arrangement according to claim 7, wherein the local washing plant includes a washing conduit for forming a re-circulation circuit including the teatcups, the local milk-collecting unit and at least a part of the milk discharge conduit, wherein the washing conduit is connected to the milk discharge conduit and includes a second valve device arranged to be opened during washing and closed during milking.

10. An arrangement according to claim 1, wherein the transport conduit forms a substantially closed re-circulation conduit.

11. An arrangement according to claim 1, wherein the arrangement includes a central washing plant for washing of the transport conduit.

12. An arrangement according to claim 10, wherein the arrangement includes a central washing plant for washing of the transport conduit, and wherein the central washing plant includes central means arranged to circulate washing liquid through the transport conduit during said washing.

13. An arrangement according to claim 12, wherein each milking station includes a first valve device permitting closing off of the milk discharge conduit, and wherein each first valve device-is arranged to be closed during said washing of the transport conduit.

14. An arrangement according to claim 1, wherein the central milk-receiving unit includes a central milk-collecting container forming a part of the transport conduit and arranged to collect the milk transported by gravity through the transport conduit.

15. An arrangement according to claim 14, wherein the central washing plant includes central means arranged to circulate washing liquid through the transport conduit during said washing, and wherein said central means includes a vacuum source connectable to the central milk-collecting container for providing said circulation of washing liquid through the transport conduit and the central milk-collecting container during said washing.

16. An arrangement according to claim 14, wherein the central milk-receiving unit includes a central milk storage tank, which is connectable to the central milk-collecting container and arranged to receive the milk from the milk-collecting container.

17. An arrangement according to claim 16, wherein the central milk-receiving unit includes a central pump device arranged to pump the milk from the milk-collecting container to the milk storage tank.

18. A method for milking of animals in a milking arrangement including a number of milking stations, the method including the steps of:
   attaching teatcups to the teats of animals to be milked in said milking stations; milking said animals;
   collecting the milk in a local milk-collecting unit in each of the milking stations during milking of said animals;
   feeding the milk from the local milk-collecting unit via a local milk discharge conduit to a common transport conduit; and
   transporting the milk in the common transport conduit substantially completely by means of gravity to a common central milk-receiving unit.

* * * * *